United States Patent [19]

Guillen

[11] Patent Number: 4,577,929
[45] Date of Patent: Mar. 25, 1986

[54] ANTI-GLARE DEVICE FOR SIDE MOUNTED REAR VISION MIRRORS

[76] Inventor: Richard H. Guillen, 9027 Rendalia, Bellflower, Calif. 90706

[21] Appl. No.: 581,962

[22] Filed: Feb. 21, 1984

[51] Int. Cl.⁴ .......................... G02B 5/08; G02B 7/24
[52] U.S. Cl. .................................. 350/283; 350/584; 296/97 A
[58] Field of Search .............. 350/276 R, 283, 584; 296/97 A, 91, 96, 84 B

[56] References Cited

U.S. PATENT DOCUMENTS

| | | | |
|---|---|---|---|
| 1,971,333 | 8/1934 | Allam | 350/283 |
| 1,994,648 | 3/1935 | Hoile | 350/283 |
| 2,045,751 | 6/1936 | Burlein | 350/283 |
| 2,070,434 | 2/1937 | Kangas | 350/283 |

*Primary Examiner*—John K. Corbin
*Assistant Examiner*—Loha Ben
*Attorney, Agent, or Firm*—Edgar W. Averill, Jr.

[57] ABSTRACT

A rear vision mirror, anti-glare and rain deflecting device for side mounted rear vision mirrors. The device has a transparent shield which is tinted and which is movable into the line of sight between the driver, the mirror and subsequently to an object being reflected. The shield is held at an angle of between ten and eighty degrees with respect to the mirror and functions not only as an anti-glare device but also as a deflector for rain, snow and the like.

8 Claims, 9 Drawing Figures

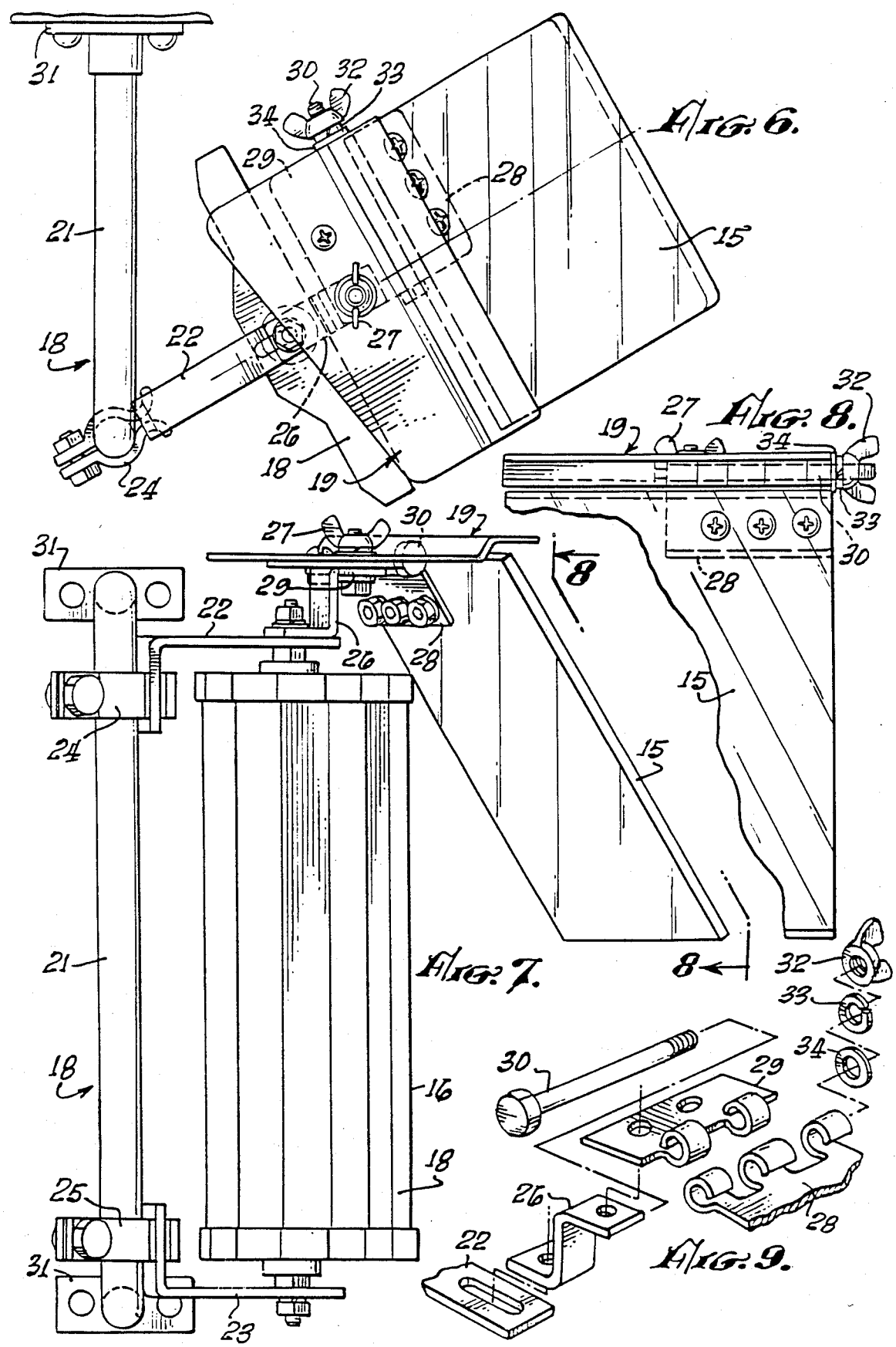

ANTI-GLARE DEVICE FOR SIDE MOUNTED REAR VISION MIRRORS

BACKGROUND OF THE DISCLOSURE

The field of the invention is rear vision mirrors of the type used on trucks, automobiles and the like. The invention relates more particularly to anti-glare rear vision mirrors which are capable of reducing the discomfort resulting from headlights from a vehicle following the vehicle to which the mirror is attached.

Anti-glare rear vision mirrors are widely used in motor vehicles. The most common type of mirror has a partially reflective glass which is mounted in front of a tiltable completely reflecting mirror. In daylight use, both mirrors are aligned to reflect all light coming through the back window. At night, to reduce headlight glare, the completely reflecting mirror is tilted either upwardly or downwardly and the partially reflective mirror only is positioned to reflect the headlights. A reflected headlight thus is only partially reflected and the discomfort of glare is eliminated. Such approach is not normally used for rear vision mirrors of the type which are mounted outside of the vehicle and typically are mounted on the left door or door frame of the vehicle. The reason that this tilting approach is not successful for outside mirrors is that the completely reflective mirror which is tilted is still capable of reflecting everything in its line of view. When the mirror is mounted within a passenger compartment at night, the compartment is darkened and the tilted reflective mirror is positioned toward a darkened portion of the vehicle and thus reflects nothing which interferes with the view from the partially reflective mirror. In outdoor environments, however, this is not so and such mirrors are not believed to be useful when mounted onto the exterior of a vehicle.

Tinted glass or plastic sheets have been mounted on interior rear vision mirrors as shown in U.S. Pat. Nos. 2,327,802; 2,070,434 and 2,525,012. Such approaches, however, have not found use for exteriorly mounted rear vision mirrors and the discomforting glare is a common problem for truck drivers and others who rely on side mounted rear vision mirrors and who are required to drive long hours at night.

SUMMARY OF THE INVENTION

It is an object of the present invention to provide an anti-glare device for a side mounted rear vision mirror. It is a further object of the present invention to provide an anti-glare device which also reduces the tendency of rain to impair the vision of a side mounted rear vision mirror.

The present invention is for a rear vision mirror, anti-glare and rain deflecting device affixable to the exterior of a motor vehicle. The device has a mirror mounting bracket affixed to the exterior of a motor vehicle and mirror means are affixed to the mirror mounting bracket. The mirror means are mounted about vertically and a transparent shield means is affixed to the mirror mounting bracket at a small distance above the top edge of the mirror means. The shield may be mounted at an angle between ten and eighty degrees with respect to the mirror means and it has a length which is less than the length of the mirror means. Preferably, the angle of mounting is adjustable and also preferably the shield is pivotable about the top mounting means thereof. A deflector vane may be mounted about horizontally above the top edge of the shield.

BRIEF DESCRIPTION OF THE DRAWINGS

FIG. 6 is an enlarged top view of the device of the present invention.

FIG. 7 is a side view of the device of the present invention.

FIG. 8 is a side view, partially broken away taken along line 8—8 of FIG. 7.

FIG. 9 is an exploded view of the mounting means of the device of the present invention.

DESCRIPTION OF THE PREFERRED EMBODIMENTS

Figure 1:
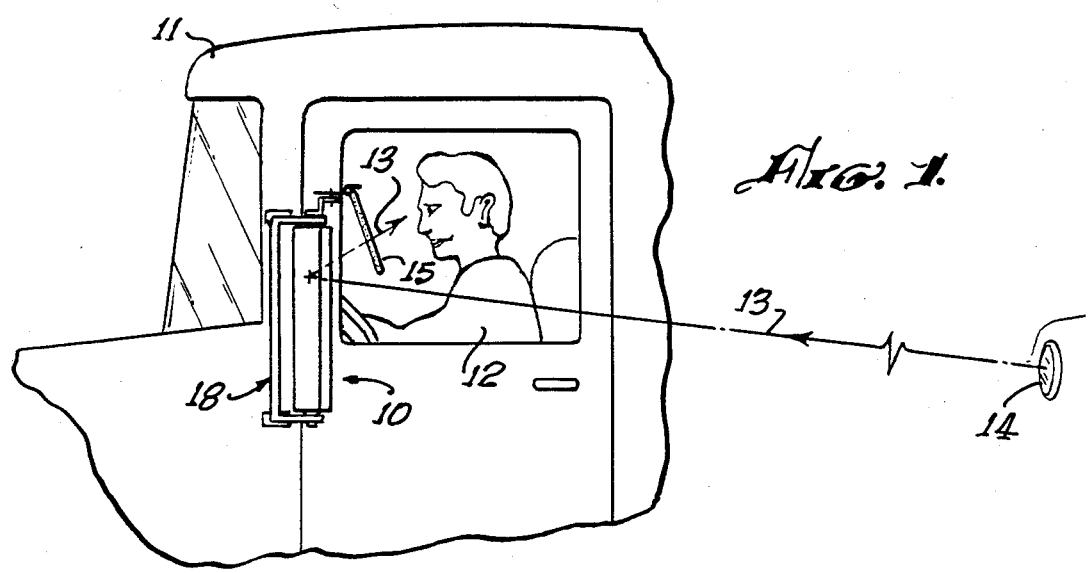
FIG. 1 is a side view of the rear vision mirror, anti-glare and rain deflecting device of the present invention shown mounted on the side of a motor vehicle.

The rear vision mirror, anti-glare and rain deflecting device of the present invention is shown in FIG. 1 and indicated generally by reference character 10. Mirror assembly 10 is mounted to the side of motor vehicle 11 and a driver 12 is shown in the cab thereof. The line of sight between the driver's eye and the headlight 14 of a following car is indicated by reference character 13. As shown in FIG. 1, the line of sight of 13 passes through a shield 15 which is preferably tinted to reduce the transmission of light therethrough. Shield 15 may be made from an acrylic plastic or other transparent substance and preferably is tinted in a manner similar to the lens of a pair of sunglasses.

Figures 2, 3:
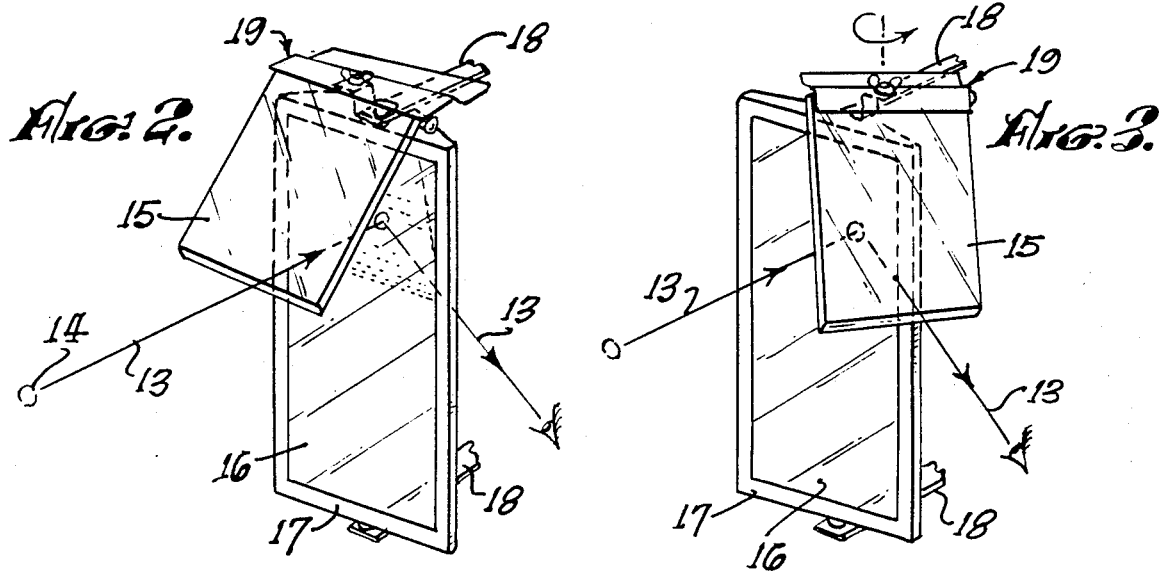
FIG. 2 is a perspective view of the rear vision mirror, anti-glare and rain deflecting device of FIG. 1.
FIG. 3 is a perspective view analogous to FIG. 2 with the shield in a pivoted position.
Figure 4:
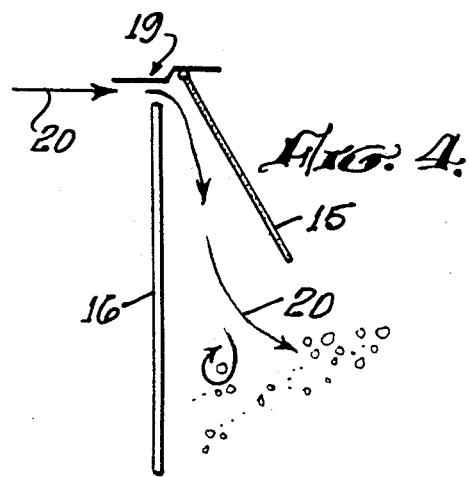
FIG. 4 is a diagramatic side view of the device of the present invention.
Figure 5:
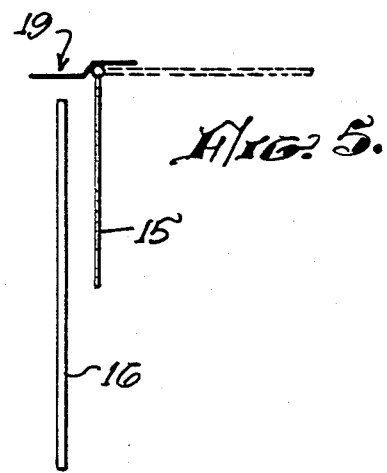
FIG. 5 is a diagramatic side view of the device of the present invention.

The mirror 16 is shown in FIG. 2 and is held in mounting bracket 17 which, in turn, is affixed to the side or door of motor vehicle 11 by a mounting bracket 18. Bracket 18 not only holds shield 15 but also holds a deflector vane 19 which assists in directing the flow of air in a manner which greatly reduces the build up of rain or snow on the face of mirror 16. As can be seen by comparing FIGS. 2 and 3, shield 15 and deflector vane 19 pivot with respect to mirror 16 and may be readily adjusted by driver 12 to suit his comfort and to effectively shield light sources from different positions behind the vehicle. Furthermore, this pivoting permits the complete elimination of shield 15 from the line of sight by pivoting out of the way. Also, by having shield 15 in the position shown in FIG. 2, the reflection from headlight 14 passes through shield 15 and is viewed by driver 12 on the surface of mirror 16 after being reduced in intensity by passing through shield 15. Alternatively, when moved to the position shown in FIG. 3, the headlight is shown directly on the surface of mirror 16 but is viewed by driver 12 through shield 15. Thus, shield 15 may be adjusted to provide optimum comfort. In extreme situations, shield 15 can be adjusted close to the surface of mirror 16 so that the headlight glare is reduced first by passing through shield 15 and secondly is further reduced by passing a second time through shield 15 on its way to driver 12.

As indicated above, shield 15 has a second function which is to deflect rain and dust away from the surface of mirror 16. Deflector vane 19 directs a flow of air as shown by arrows 20 above the top of mirror 16 and under deflector vane 19. It has been found that this flow of air greatly reduces the depositing of the typical muddy spray which often exists when driving on wet highways and also reduces the build up of rain or snow. As will be described more in detail below, shield 15 may be pivoted about its mounting point at the top thereof so that optimum deflection may be obtained. At night or when backing up, shield 15 may be adjusted downwardly close to the mirror 16. Alternatively, during rain storms it may be positioned about horizontally which is very useful when backing up to prevent the depositing of rain on the surface of mirror 16. Since a truck driver is very dependent upon his mirrors for vision for backing, this adjustment to a near horizontal position can be very important.

The details of construction of the device of the present invention is shown in FIGS. 6 through 9. The mounting bracket which has been indicated generally by reference character 18 is made up of a L-shaped arm 21 which is affixed to the side of vehicle 11 by a mounting plate 31. A pair of L-shaped brackets 22 and 23 are held to arm 21 by a pair of clamps 24 and 25. A third L-shaped bracket 26 is bolted to bracket 22 and holds deflector vane 19. Shield 15 may be moved and affixed in a desired position by tightening wing nut 27 affixed to a bolt passing through bracket 22. Shield 15 is held to bracket 22 by a pair of hinge plates 28 and 29 which in turn are held together by pin 30. Pin 30 is held to hinge plates 28 and 29 by nut 32, and a lock washer 33 and a washer 34 are positioned between wing nut 32 and hinge plate 28.

The shield 15 of the assembly of the present invention thus can be affixed in a desired position by the manipulation of wing nuts 27 and 32. The relative angular position of shield 15 with respect to the surface of mirror 16 is most easily expressed by the angle between these two members. This angle can be found by drawing a horizontal line on the surface of mirror 16 and imagining a horizontal plane intersecting this line and running the same horizontal plane to the inner surface of shield 15 the intersection forming a second horizontal line. The angle between these two horizontal lines both on the same horizontal plane forms the angular position between the two members which is easily adjustable and provides an important feature in providing the optimum of driver comfort. A second angle may be determined by taking a vertical plane and measuring the angle between the line lying on the surface of mirror 16 which intersects the vertical plane and the line formed on the inner surface of shield 15 which also intersects the vertical plane. This angle is adjustable by the movement of the hinge plates 28 and 29 and also provides an important adjustment for the driver.

It has been found that the use of the device of the present invention greatly reduces driver fatigue and helps to keep a clear view free from rain and mud. In the past, attempts have been made to place a film on the surface of a mirror to reduce glare but this had two important defects. First, the film would tend to peel off and secondly the film caused an undesirable shadow which interfered with the viewing of a reflection. Another advantage of the device of the present invention is the easy replacement of the shield in the event that it does become scratched by improper cleaning or abrasion from sand or other objects. The material of construction is preferably an optically clear material such as an acrylic plastic which has been tinted with a grey or green color. The edges are preferably beveled for appearance and to facilitate the adjustment thereof.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A rear vision mirror anti-glare and rain deflecting device combination affixable to the exterior of a motor vehicle, said device comprising:

a mirror mounting bracket affixed to the exterior of a motor vehicle;

mirror means affixed to said mirror mounting bracket by an upper arm affixed to the bracket and to the top of the mirror means and a lower arm affixed to the bracket and to the bottom of the mirror means, said mirror means being mounted about vertically on said mounting bracket between said upper arm and said lower arm; and transparent shield means affixed to said upper arm at a small distance above the top edge of the mirror means and affixed at an angle of between 10 and 80 degrees with respect to said mirror means, said transparent shield means having a length which is less than the length of said mirror means.

2. The rear vision mirror anti-glare and rain deflecting device combination of claim 1 wherein said transparent shield means is fabricated from tinted transparent material.

3. The rear vision mirror anti-glare and rain deflecting device combination of claim 1 wherein the angle between said mirror means and said transparent shield means is adjustable.

4. The rear vision mirror anti-glare and rain deflecting device combination of claim 1 wherein the angle between a horizontal line lying on the surface of the mirror means and an intersecting horizontal line lying on the surface of the transparent shield means is adjustable.

5. The rear vision mirror anti-glare and rain deflecting device combination of claim 1 further including deflector vane means affixed to said mounting bracket and adjacent to the upper edge of said transparent shield means.

6. The rear vision mirror anti-glare and rain deflecting device combination of claim 5 wherein said deflector vane means is mounted about horizontally.

7. The rear vision mirror anti-glare and rain deflecting device combination of claim 6 wherein said deflector vane means is mounted pivotally with respect to said mirror mounting bracket.

8. The rear vision mirror anti-glare and rain deflecting device combination of claim 1 wherein said shield means is movable to about a horizontal position to move it out of the line of vision of a user when not required.

* * * * *